(12) United States Patent
Wen et al.

(10) Patent No.: US 9,560,200 B2
(45) Date of Patent: Jan. 31, 2017

(54) METHOD AND DEVICE FOR OBTAINING VOICE SERVICE

(71) Applicant: Xiaomi Inc., Beijing (CN)

(72) Inventors: Zhenwei Wen, Beijing (CN); Tao Peng, Beijing (CN); Ruijun Xu, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 67 days.

(21) Appl. No.: 14/585,217

(22) Filed: Dec. 30, 2014

(65) Prior Publication Data

US 2015/0373195 A1 Dec. 24, 2015

Related U.S. Application Data

(63) Continuation of application No. PCT/CN2014/089329, filed on Oct. 23, 2014.

(30) Foreign Application Priority Data

Jun. 24, 2014 (CN) .......................... 2014 1 0286323

(51) Int. Cl.
*H04M 3/42* (2006.01)
*H04M 3/493* (2006.01)
(Continued)

(52) U.S. Cl.
CPC ............. *H04M 3/4938* (2013.01); *H04W 4/16* (2013.01); *H04M 1/72519* (2013.01); *H04M 1/72583* (2013.01); *H04M 2250/22* (2013.01)

(58) Field of Classification Search
CPC .............. H04M 1/7255; H04M 3/4938; H04M 1/72519; H04M 1/72583; H04M 2250/22; H04W 4/16
(Continued)

(56) References Cited

U.S. PATENT DOCUMENTS

| 6,788,770 | B1 | 9/2004 | Cook et al. |
| 2007/0025529 | A1 | 2/2007 | Romeo |

(Continued)

FOREIGN PATENT DOCUMENTS

| CN | 101001287 A | 7/2007 |
| CN | 101178740 A | 5/2008 |

(Continued)

OTHER PUBLICATIONS

"International Search Report for PCT/CN2014/089329".
"Extended European Search Report for 15168635.9".

*Primary Examiner* — Babar Sarwar
(74) *Attorney, Agent, or Firm* — Jun He Law Offices P.C.; James J. Zhu

(57) ABSTRACT

The present disclosure discloses a method and device for obtaining a voice service. The method includes: obtaining information on a service process corresponding to a service number of a call, wherein the information on the service process comprises input prompt information for each stage of the service process, and the input prompt information is used to prompt a user for input; displaying, after getting through the call, the input prompt information of the service process; receiving an input signal from the user in response to the input prompt information; and sending the input signal to an automatic voice service system to obtain a service therefrom. The method and device avoid the problems that the user does not know what kind of response signal should be input to continue the query until he or she hears the whole voice prompt information.

19 Claims, 7 Drawing Sheets

(51) Int. Cl.
*H04W 4/16* (2009.01)
*H04M 1/725* (2006.01)

(58) Field of Classification Search
USPC ....... 455/412.1–416, 418–422.1, 552.1, 566;
379/88.11, 88.12, 88.16, 93.11, 93.25,
379/93.26, 93.17, 93.03
See application file for complete search history.

(56) References Cited

U.S. PATENT DOCUMENTS

| | | |
|---|---|---|
| 2008/0220810 A1 | 9/2008 | Landschaft et al. |
| 2009/0154666 A1 | 6/2009 | Rios et al. |
| 2009/0209239 A1 | 8/2009 | Montesdeoca |
| 2013/0022181 A1* | 1/2013 | Or-Bach ............... H04M 3/493 379/88.11 |
| 2014/0134979 A1 | 5/2014 | Sen et al. |

FOREIGN PATENT DOCUMENTS

| | | |
|---|---|---|
| CN | 101188644 A | 5/2008 |
| CN | 101355610 A | 1/2009 |
| CN | 101847406 A | 9/2010 |
| CN | 102056326 A | 5/2011 |
| CN | 102724345 A | 10/2012 |
| CN | 103002166 A | 3/2013 |
| CN | 103118206 A | 5/2013 |
| CN | 103188407 A | 7/2013 |
| CN | 103250402 A | 8/2013 |
| CN | 103428377 A | 12/2013 |
| JP | 2004356896 A | 12/2004 |
| JP | 2008507187 A | 3/2008 |
| JP | 2008219903 A | 9/2008 |
| JP | 2009212566 A | 9/2009 |
| JP | 2009213027 A | 9/2009 |
| KR | 20050016693 A | 2/2005 |
| KR | 20130059278 A | 6/2013 |
| RU | 95206 U1 | 6/2010 |

* cited by examiner

METHOD AND DEVICE FOR OBTAINING VOICE SERVICE

CROSS-REFERENCE TO RELATED APPLICATIONS

This application is a Continuation Application of International Application PCT/CN2014/089329, with an international filing date of Oct. 23, 2014, which claims priority to Chinese Patent Application No. 201410286323.1, filed on Jun. 24, 2014, the entire contents of which are incorporated herein by reference.

TECHNICAL FIELD

The present disclosure generally relates to mobile communication, and more particularly, to a method and a device for obtaining a voice service.

BACKGROUND

Nowadays more and more companies select to use an automatic voice service system to provide services for users. For example, a mobile operator uses an automatic voice service system with a service number '1008x' to provide business query services for its users.

When a user needs to make a query using an automatic voice service system, he or she uses a terminal device to dial in the automatic voice service system. Then the automatic voice service system sends back voice prompt information to the terminal device according to a preset service process, and the terminal device receives and plays the voice prompt information accordingly. Moreover, the terminal device receives an input signal such as a keyboard signal that is inputted by the user through a keyboard after the user hears the voice prompt information. The terminal device sends the received input signal to the automatic voice service system, and receives subsequent voice prompt information or from the automatic voice service system or receives query result from the automatic voice service system.

SUMMARY

The present disclosure provides methods and devices for obtaining a voice service.

According to a first aspect of the present disclosure, there is provided a method for obtaining a voice service. The method includes obtaining information on a service process corresponding to a service number of a call, wherein the information on the service process comprises input prompt information for each stage of the service process, and the input prompt information is used to prompt a user for input; displaying, after getting through the call, the input prompt information of the service process; receiving an input signal from the user in response to the input prompt information; and sending the input signal to an automatic voice service system to obtain a service therefrom.

According to a second aspect of the present disclosure, there is provided a device for obtaining a voice service, including: a processor; and a memory for storing instructions executed by the processor; wherein the processor is configured to obtain information on a service process corresponding to a service number of a call, wherein the information on the service process comprises input prompt information for each stage of the service process, and the input prompt information is used to prompt a user for input; display, after getting through the call, the input prompt information of the service process; receive the input signal from the user in response to the input prompt information; and send the input signal to an automatic voice service system to obtain a service therefrom.

According to a third aspect of the present disclosure, there is provided a non-transitory storage medium having stored therein instructions that, when executed by one or more processors of a device for obtaining a voice service, causes the device to perform: obtaining information on a service process corresponding to a service number of a call, wherein the information on the service process comprises input prompt information for each stage of the service process, and the input prompt information is used to prompt a user for input; displaying, after getting through the call, the input prompt information of the service process; receiving the input signal from the user in response to the input prompt information; and sending the input signal to an automatic voice service system to obtain a service therefrom.

The technical solutions provided by the embodiments of the present disclosure may include the following advantageous effects.

By directly displaying the input prompt information of the service process of an ongoing call on a screen of the terminal device, the user may directly input his or her selections according to the input prompt information displayed on the screen, without waiting for playing the whole voice prompt information. The method avoids the problems in the related art that the user needs to hear the whole voice prompt information to get understanding of what response should be input to proceed with the query, and thus it takes the user too long to wait and shortens a service life of the terminal device's battery. In this way, the user may directly input according to the input prompt information displayed on the screen, and the waiting time of the user can be reduced.

It is to be understood that both the foregoing general description and the following detailed description are exemplary only and are not restrictive of the present disclosure.

BRIEF DESCRIPTION OF THE DRAWINGS

The accompanying drawings, which are hereby incorporated in and constitute a part of this specification, illustrate embodiments being consistent with the present disclosure and, together with the description, serve to explain the principles of the present disclosure.

FIG. 4 is a schematic diagram illustrating an apparatus for obtaining a voice service, according to an exemplary embodiment;

DETAILED DESCRIPTION

Exemplary embodiments will be described in details herein, with examples thereof shown in drawings. In the following descriptions, when the drawings are referred to, unless expressed otherwise, the same number in different drawings refers to the same or similar elements. The implementary manners described in the exemplary embodiments below do not represent all implementary manners which are consistent with the present disclosure. On the contrary, they are only examples of devices and methods that are consistent with some aspects of the present disclosure as recited in the claims.

Figure 1:
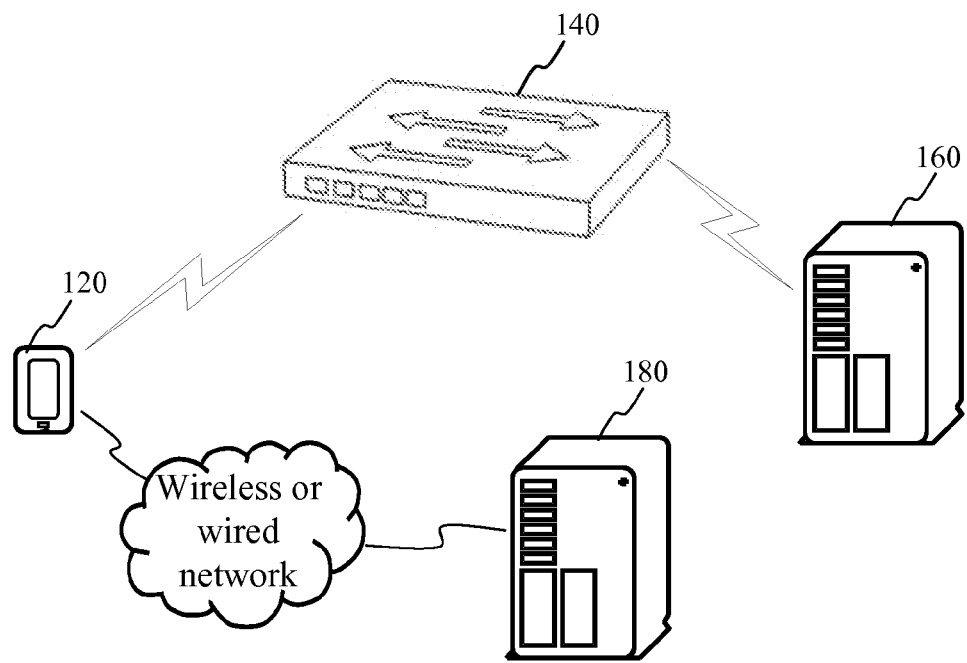
FIG. 1 is a schematic diagram illustrating an implementary environment in which a method for obtaining a voice service according to exemplary embodiments can be applied.

FIG. 1 is a schematic diagram illustrating an implementation environment for applying various embodiments of the present disclosure. The implementation environment includes a terminal device 120, a switch 140 and an automatic voice service device 160.

The terminal device 120 includes a communication component configured to communicate with other apparatuses in a wired or wireless manner. The terminal device 120 may be a telephone set, a cell phone, a tablet PC or the like.

The terminal device 120 may be connected to the switch 140 in a wired or wireless manner.

The switch 140 is configured to set up a communication connection between the terminal device 120 and the automatic voice service device 160 to exchange information between the terminal device 120 and the automatic voice service device 160.

The switch 140 may be connected to the automatic voice service device 160 in a wired or wireless manner.

The automatic voice service device 160 is installed with an automatic voice service system. The automatic voice service device 160 may be a terminal device, a server, a server cluster composed of several servers, or a cloud computing service center.

Alternatively, the implementation environment may further include a server 180 which is connected to the terminal device 120 via a wired network or a wireless network.

The server 180 may be a server, a server cluster composed of several servers, or a cloud computing service center.

Figure 2:
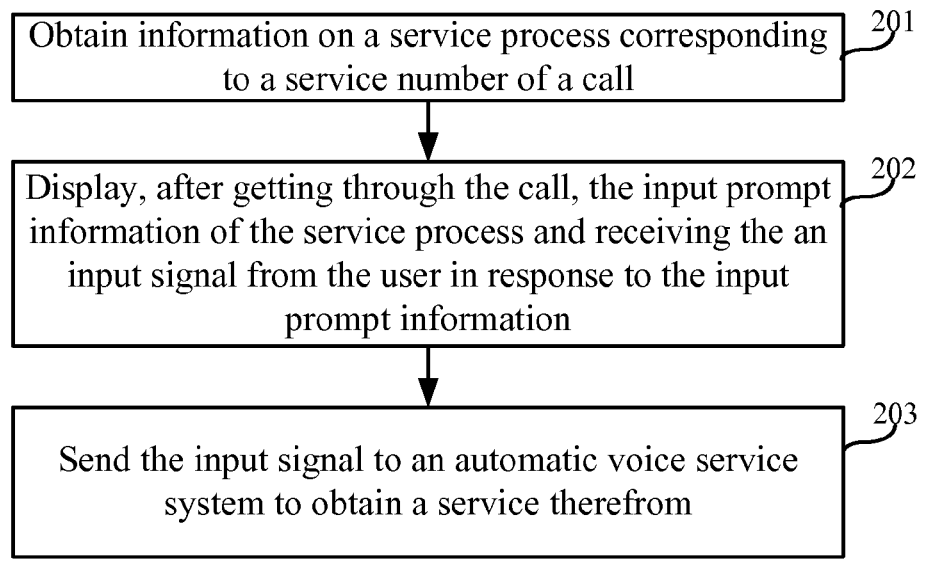
FIG. 2 is a flow chart showing a method for obtaining a voice service, according to an exemplary embodiment.

FIG. 2 is a flow chart showing a method for obtaining a voice service, according to an exemplary embodiment. As shown in FIG. 2, the method for obtaining the voice service can be implemented on the terminal device 120 in the implementation environment shown in FIG. 1. The method for obtaining the voice service may include the following steps.

In step 201, information on a service process corresponding to a service number of a call is obtained.

The information on the service process comprises input prompt information for each stage of the service process. The input prompt information is used to prompt a user for input into the terminal device.

In step 202, after getting through the call, the input prompt information of the service process is displayed, and the input signal from the user in response to the input prompt information is received.

In step 203, the input signal is sent to an automatic voice service system such as the automatic voice service device 160 shown in FIG. 1. The automatic voice service system is used to provide a service according to the input signal.

In conclusion, in the method for obtaining the voice service provided by the embodiments of the present disclosure, by directly displaying the input prompt information of the service process of an ongoing call on a screen of the terminal device, the user may directly input his or her selections according to the input prompt information displayed on the screen, without waiting for playing the whole voice prompt information. The method avoids the problems in the related art that the user needs to hear the whole voice prompt information to get understanding of what response should be input to proceed with the query, and thus it takes the user too long to wait and shortens a service life of the terminal device's battery. In this way, the user may directly input according to the input prompt information displayed on the screen, and the waiting time of the user can be reduced.

FIG. 3 is a flow chart showing a method for obtaining a voice service, according to an exemplary embodiment. As shown in FIG. 3, the method for obtaining the voice service may be implemented on the terminal device 120 in the implementation environment shown in FIG. 1. The method for obtaining the voice service may include the following steps.

In step 301, a number that is keyed in but not outgoing, a number that is outgoing but is not got through, or a number that is outgoing and got through is obtained, The number that is keyed in but not outgoing refers to a number input by the user through a numeric keypad of a dialing interface or a number that is selected from a contact list by the user, and a call corresponding to the number is not made by the user.

The number that is outgoing but not got through refers to a number which is triggered by the user to make a call corresponding to the number, but the call is not got through to the automatic voice service system temporarily. In other words, the communication connection is not set up between the terminal device and the automatic voice service device through the switch temporarily.

The number that is outgoing and got through refers to a number which is triggered by the user to make a call corresponding to the number, and the call is got through to the automatic voice service system. In other words, the communication connection is set up between the terminal device and the automatic voice service device through the switch.

In step 302, whether the number is a service number is detected.

The terminal device detects whether the obtained number is a service number. The service number refers to a number that is provided by a service provider to provide an automatic voice service for users. The service number is usually a customized phone number, and the users may obtain various kinds of services provided by different service providers by dialing the service number through the terminal device such as a telephone set or a cell phone. In certain embodiments, the terminal device may detect whether the obtained number is a number in a number database. If yes, the obtained number is determined as the service number;

and if not, the obtained number is determined not as the service number. The number database includes various service numbers.

For example, a service number of a telecommunication operator is 10081, a service number of a bank is 95555, and a service number of a ticketing service system is 12306 or the like.

In step 303, if it is detected that the number is the service number, information on a service process corresponding to the service number of the call is obtained.

If the terminal device detects that the obtained number is the service number, the terminal device may obtain information on a service process corresponding to the service number of the call. The call may be any one of a call that is keyed in but not outgoing, a call that is outgoing but not got through, and a call that is outgoing and got through. The information on the service process comprises input prompt information for each stage of the service process, and the input prompt information is used to prompt a user for input.

If the terminal device detects that the obtained number is not the service number, the process is ended.

Since the information on the service process may be locally stored in the terminal device, or may be stored in a remote server, the step that the terminal device obtains the information on the service process corresponding to the service number may vary depending on where the information on the service process is stored. The information on the service process may be obtained in at least two manners as follow.

In a first manner, when the information on the service process is locally stored in the terminal device, the step may include selecting a service process of a service number of a call from pre-stored service processes of a plurality of service numbers.

The prestored service processes of the plurality of service numbers are service processes obtained from the server and stored by the terminal device. For example, the server actively pushes the information on the service process of the service number to the terminal device, and the terminal device receives the information on the service process of the service number pushed by the server, and stored the received information on the service process of the service number.

In a second manner, when the information on the service process is stored in the server, the following steps may be performed to obtain the service process.

(1) The service number is sent to the server.

(2) The server selects the service process corresponding to the service number of the call from pre-stored service processes of a plurality of service numbers.

The server receives the service number sent by the terminal device, selects the service process corresponding to the received service number from the pre-stored service processes of the plurality of service numbers, and uses the selected service process as the service process corresponding to the call.

(3) The service process of the service number sent by the server is received.

Correspondingly, the terminal device may receive the information on the service process of the service number from the server, and thus obtain the information on the service process of the service number of the call.

In step 304, after the service number is got through, the input prompt information of the service process is displayed, and the input signal from the user in response to the input prompt information is received.

After the terminal device gets through the service number, i.e. after the terminal device is connected to the automatic voice service system, the terminal device may display the obtained input prompt information of the service process. After the user has seen the input prompt information displayed on the terminal device, the user may key in the input signal in response to the input prompt information of the terminal device according to the input prompt information displayed on the terminal device. Correspondingly, the terminal device may receive the input signal that is input by the user for responding to the input prompt information. The input signal refers to a signal from the user through a physical keyboard of the terminal device or through a virtual keyboard on a touch screen of the terminal device.

Figure 3A:
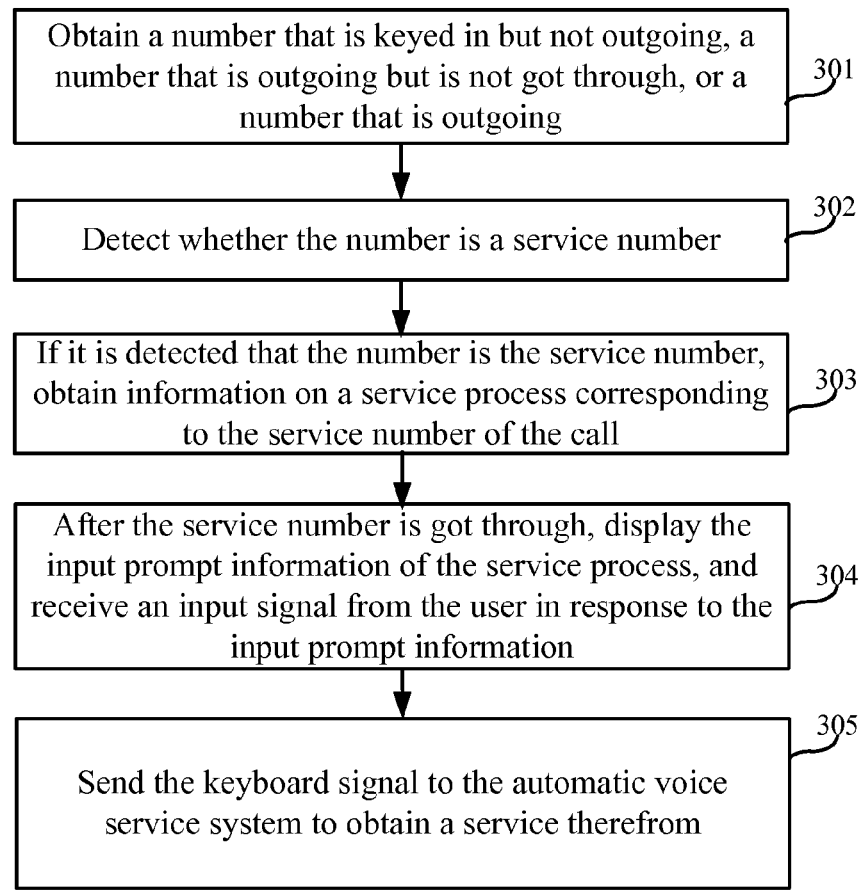
FIG. 3A is a flow chart showing a method for obtaining a voice service, according to another exemplary embodiment.
Figure 3B:
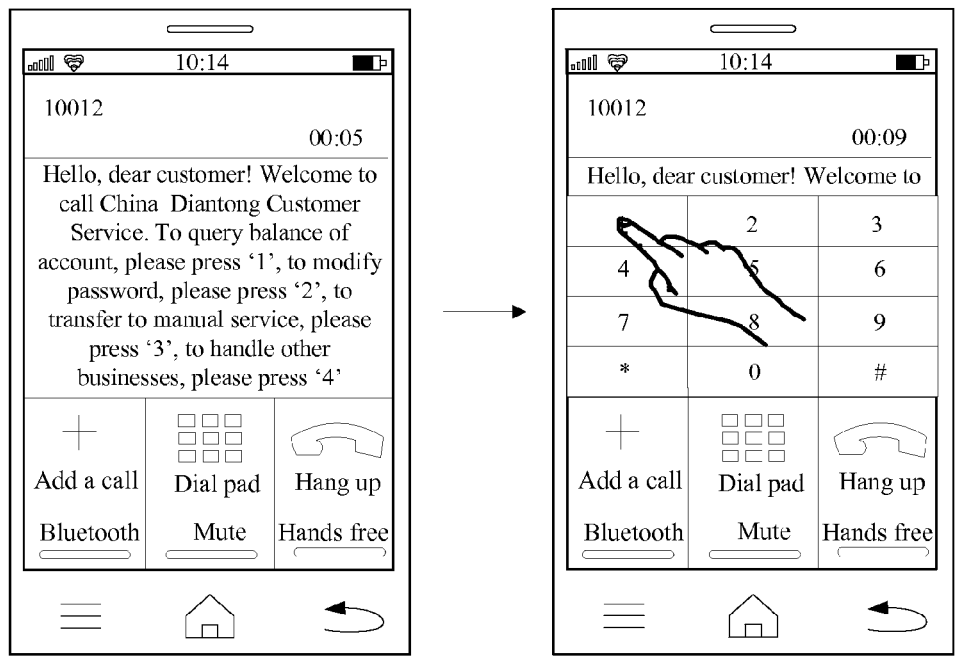
FIG. 3B is a display schematic diagram illustrating display of input prompt information on a terminal device, according to an exemplary embodiment.

For example, referring to FIG. 3B, after the terminal device gets through a service number '10012', the terminal device may display the input prompt information shown in FIG. 3B. After the user has seen the input prompt information displayed on the terminal device, the user may query a balance of account by keying in '1' through a keyboard of the terminal device. Correspondingly, the terminal device may receive the input signal '1' from the user. Since it takes much less time for the terminal device to display the input prompt information than to play voice prompt information returned by the automatic voice service system, the user may directly key in his or her selection according to the input prompt information displayed on the terminal device, without listening to the voice prompt information returned by the automatic voice service system. This saves the waiting time of the user, and increases the efficiency for obtaining the voice service by the terminal device.

The service process may include two or more stages performed in certain sequence, and the call may transfer from a stage to another stage upon triggering of the input signal. Thus, when the service process obtained by the terminal device includes n stages, the step of displaying the input may include the following steps.

Firstly, input prompt information of an $i^{th}$ stage of the service process is displayed.

The terminal device may display input prompt information of the $i^{th}$ stage of the service process, wherein n and i are positive integers, and an initial value of i is 1.

In certain embodiments, after the terminal device gets through to the service number, the terminal device may firstly display input prompt information of a first stage of the service process.

Secondly, the input signal that is from the user for responding to the input prompt information of the $i^{th}$ stage is received.

After the user has seen the input prompt information of the $i^{th}$ stage displayed on the terminal device, the user may input the input signal for responding to the input prompt information of the $i^{th}$ stage through a keyboard of the terminal device according to his or her requirements. Correspondingly, the terminal device may receive the keyboard signal that is from the user for responding to the input prompt information in the $i^{th}$ stage.

In certain embodiments, the step of receiving the input signal may be implemented in three manners as follows.

In a first manner, the step may include receiving a single character from the user, and using an input signal corresponding to the character as the input signal.

In certain conditions, the input prompt information of the $i^{th}$ stage displayed on the terminal device is a first type of prompt information, which is prompt information used to prompt the user to input one of multiple preset keyboard signals. Since the input signal is usually a keyboard signal corresponding to a single character, after the terminal device receives the single character from the user, the terminal device may use the input signal corresponding to the character as the input signal.

In certain embodiments, the step in which the terminal device uses the input signal corresponding to the inputted character as the input signal may include that the terminal device generates a DTMF (Dual Tone Multi Frequency) signal corresponding to the character, and uses the generated DTMF as the input signal. The DTMF signal is a composite signal that is composed of a high-frequency signal and a low-frequency signal superimposed with the high-frequency signal. For example, a high-frequency signal group includes four different high-frequency signals, a low-frequency signal group includes four different low-frequency signals, and 16 different composite signals may be obtained by selecting a high-frequency element from the high-frequency signal group and a low-frequency element from the low-frequency signal group. Each type of the composite signal represents a button number, respectively. For example, character "1" may be represented by a composite signal which is composed of a high-frequency signal of 1209 Hz and a low-frequency signal of 697 Hz.

In a second manner, the step may include successively receiving one or more characters from the user until receiving a predetermined character, and using an input signal corresponding to the one or more characters received before the predetermined character as the input signal.

In certain conditions, the input prompt information of the $i^{th}$ stage is a second type of prompt information, which is prompt information used to prompt the user to input his or her personalized information, thus the input signal from the user usually corresponds to two or more keyboard signals. For example, when the input prompt information of the $i^{th}$ stage is prompt information for prompting the user to input a password or prompting the user to input a bank card number, the terminal device may successively receive one or more characters from the user. Moreover, when the predetermined character is received, an input signal corresponding to the one or more characters received before the predetermined character can be determined as the input signal. In certain embodiments, the terminal device may generate a DTMF signal corresponding to the characters received before the predetermined character is received, and use the generated DTMF signals as the input signal.

For example, the predetermined character may be '#'. When the input prompt information of the $i^{th}$ stage displayed on the terminal device prompts the user to input a password, the input signals a character string '679925#' through the keyboard of the terminal device, the terminal device generates a set of DMTF signals including and corresponding to the characters of the string '679925', and uses the generated DMTF signals as the input signal.

In a third manner, the step may include successively receiving one or more characters from the user and detecting whether a number of the received characters reaches a predetermined number. If the number of the received characters reaches the predetermined number, an input signal corresponding to the characters of the predetermined number is used as the input signal.

In certain conditions, a number of figures of some information in the personalized information to be from the user is usually fixed. For example, a password is of usually 6 figures, a card number of a debit card is usually of 19 figures, and a card number of a credit card is usually of 16 figures. When the input signals certain characters, the terminal device may also detect whether the number of the received characters reaches a predetermined number. For example, when the input prompt information displayed on the terminal device is to prompt the user to input the password, the terminal device may detect whether the number of the received characters reaches 6. If the number of the received characters reaches the predetermined number, an input signal corresponding to the predetermined number of characters is used as the input signal. And if the number of the received characters does not reach the predetermined number, the terminal device continues waiting for the user to input, until the number of the received characters reaches the predetermined number. In certain embodiments, the terminal device may generate a set of DTMF signals including and corresponding to the characters of the predetermined number of characters, and use the generated DTMF signals as the input signal.

Thirdly, when i<n and the service process has the input prompt information of the $(i+1)^{th}$ stage corresponding to the input prompt information of the $i^{th}$ stage upon triggering of the input signal, the input prompt information of the $(i+1)^{th}$ stage that is triggered by the input signal is determined according to the service process and the input prompt information of the $i^{th}$ stage.

The step in which the terminal device determines the input prompt information of the $(i+1)^{th}$ stage that is triggered by the input signal may include the following steps.

(1). A process state machine of the service process is obtained, wherein each state in the process state machine is represented by input prompt information corresponding to the state.

After the terminal device obtains the service process of the service number, the terminal device may build a process state machine of the service process according to the obtained service process, wherein each state in the process state machine is represented by input prompt information corresponding to the state. As a result, after the terminal device receives the input signal from the user, the terminal device may obtain the process state machine of the service process to proceed with the following steps.

(2). The input prompt information of the $(i+1)^{th}$ stage triggered by the input signal is determined according to the process state machine and the input prompt information of the $i^{th}$ stage.

The terminal device determines the input prompt information of the $(i+1)^{th}$ stage that is triggered by the input signal according to the obtained process state machine and the input prompt information of the $i^{th}$ stage that is displayed before the input signal is received.

It should be noted that, when i>n, or the input prompt information of the $(i+1)^{th}$ stage corresponding to the input prompt information of the $i^{th}$ stage is not included in the service process upon triggering of the input signal, the terminal device may directly proceed with step 305.

Fourthly, i is added by 1, and the step of displaying the input prompt information of the $i^{th}$ stage of the service process is performed again.

After the terminal device determines the input prompt information of the $(i+1)^{th}$ stage, the terminal device may add i by 1, and perform the step of displaying the input prompt information of the $i^{th}$ stage of the service process again.

Hereinafter, the above step is further described with more detailed by reference to an example of a service process of service number '10081'. The service process of service number '10081' includes four stages. After the terminal device gets through to '10081', the terminal device may firstly display the input prompt information of the first stage shown in FIG. 3C. After the user has seen the input prompt information displayed on the terminal device, the user may make a request for querying bills by inputting a character '4' through the keyboard. Since input prompt information in the second stage corresponding to the input prompt information of the first stage exists upon triggering of '4', the terminal device may determine the input prompt information of the second stage upon triggering of '4' according to a process state machine for the service number '10081', and display the determined input prompt information of the second stage. After the user has seen the input prompt information displayed on the terminal device, the user may input '1' to make a request for querying bills of last month. Since input prompt information of the third stage corresponding to the input prompt information of the second stage does not exist in the service process upon triggering of '1', the terminal device may end skipping and directly proceed with step 305.

Furthermore, it may take certain period from the time when the terminal device receives the input signal and determines the input prompt information of the $(i+1)^{th}$ stage to the time when the terminal device displays the determined input prompt information, and it may also take certain period from the time when the terminal device sends the input signal to the automatic voice service system to the time when the terminal device receives the voice prompt information returned by the automatic voice service system, and certain time interval may exist between the two periods. Thus, in order to assure synchronization of the input prompt information displayed on the terminal device and the voice prompt information returned by the automatic voice service system, the service process may further include displaying the time interval from the time when the terminal device sends the received user input to the automatic voice service system to the time when the terminal device receives the voice prompt information returned by the automatic voice service system, after the terminal device displays the input prompt information of the $i^{th}$ stage. Then the above fourth substep may include the following steps.

1. A time period over which the terminal device receives the input signal is obtained.

The time period over which the terminal device receives the input signal refers to a time period from a moment when the terminal device receives the input signal to the current moment.

2. It is determined whether the obtained time period reaches the time interval.

The terminal device determines whether the obtained time period reaches the time interval. There may be various time intervals defined in the service process, which may be the same or different, the present embodiment is not limited thereto. In the present embodiment, the time interval is specifically defined as 3 seconds, and the terminal device may determine whether the obtained time period reaches 3 seconds.

3. If it is determined that the obtained time period reaches the time interval, the determined input prompt information of the $(i+1)^{th}$ stage is directly displayed.

If it is determined that the obtained time period reaches the time interval, the terminal device may directly display the determined input prompt information of the $(i+1)^{th}$ stage. Thus, when the terminal device displays the input prompt information of the $(i+1)^{th}$ stage, the terminal device may also receive automatic voice prompt information corresponding to the input prompt information of the $(i+1)^{th}$ stage, which achieves synchronization between the two.

4. If it is determined that the obtained time period does not reach the time interval, the determined input prompt information of the $(i+1)^{th}$ stage may be displayed until the time period reaches the time interval.

If the time period does not reach the time interval, the terminal device may enter into a waiting state such that when the time period reaches the time interval, the terminal device displays the determined input prompt information of the $(i+1)^{th}$ stage.

In step 305, the input signal is sent to the automatic voice service system, and the automatic voice service system is used to provide a service according to the input signal.

The terminal device may send the input signal to the automatic voice service system, and the automatic voice service system provides a service according to the input signal upon receiving the input signal.

When the input signal is the DTMF signal, the terminal device may send the DTMF signal to the automatic voice service system. For example, the terminal device may send a DTMF signal corresponding to character '1' to the automatic voice service system, and the automatic voice service system returns the queried bills of last month after receiving the DTMF signal.

It should be noted that, in step 304, when the input prompt information of the $i^{th}$ stage is the first type of prompt information, and the first type of prompt information is prompt information used to prompt the user to input one of preset keyboard signals, before the terminal device performs the third substep, the terminal device may also perform the following steps.

(1) Whether the input signal is one of the preset keyboard signals which are prompted to be from the input prompt information of the $i^{th}$ state is determined.

The input prompt information of the $i^{th}$ stage displayed on the terminal device is to prompt the user to input one of preset keyboard signals. Thus, in order to determine whether the input signal from the user is valid, the terminal device may detect whether the received input signal is one of the preset keyboard signals which are prompted to be from the input prompt information of the $i^{th}$ stage.

Figure 3C:
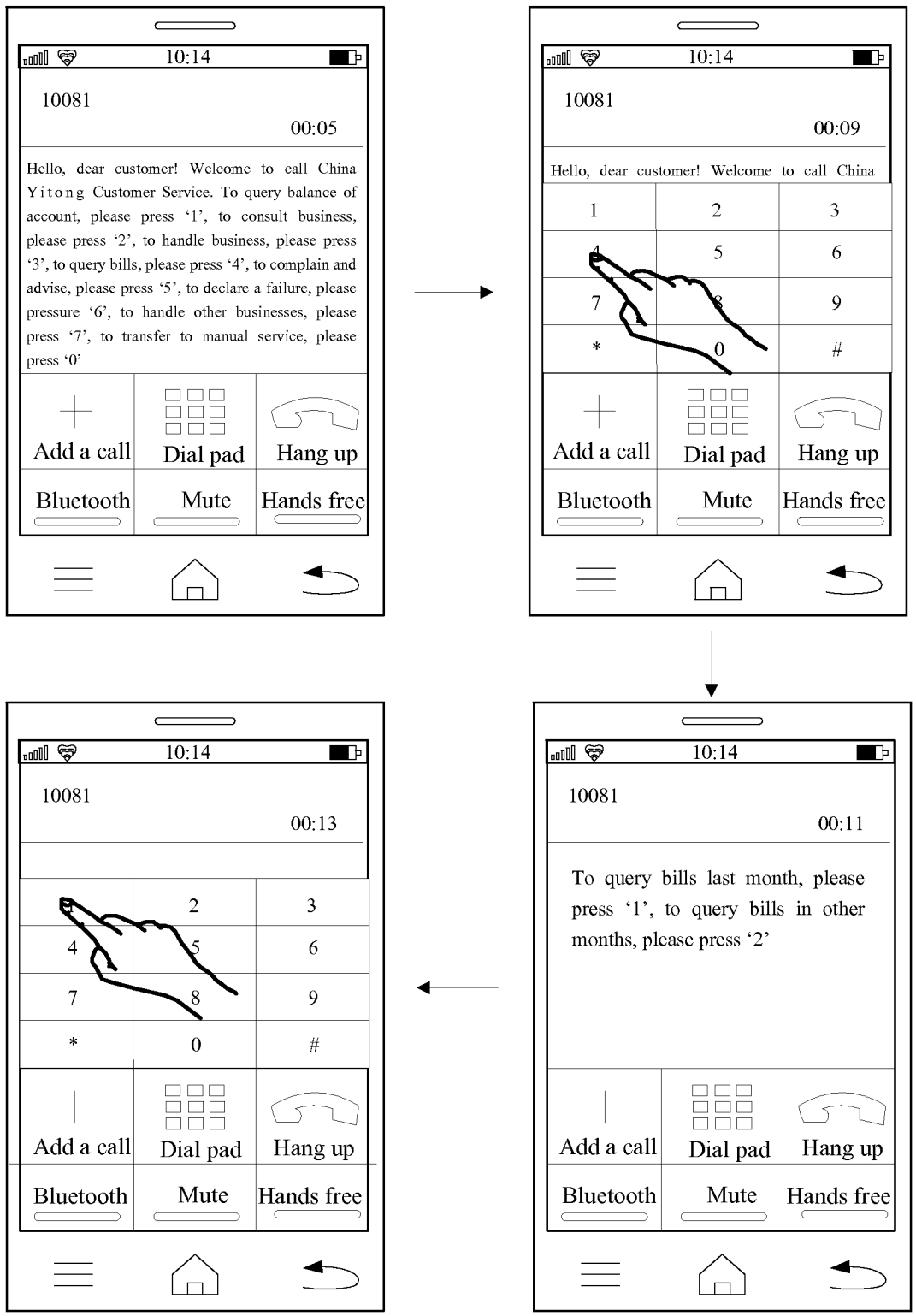
FIG. 3C is another display schematic diagram illustrating display of input prompt information on a terminal device, according to an exemplary embodiment.

For example, referring to FIG. 3C, after the terminal device displays the input prompt information of the first stage and receives a input signal corresponding to '*' from the user, the terminal device may detect whether the received input signal corresponds to one of keyboard signals '0', '1', '2', '3', '4', '5', '6' and '7'.

(2) If the input signal is not one of the preset keyboard signals which are prompted to be from the input prompt information of the $i^{th}$ stage, the input prompt information of the $i^{th}$ stage may be displayed, or prompt information used to prompt that the input signal is incorrect may be displayed, or communication with the automatic voice service system may be terminated.

If the detection result of the terminal device shows that the input signal is not one of the preset keyboard signals which are prompted to be from the input prompt information of the $i^{th}$ stage, the terminal device may display the input prompt information of the $i^{th}$ stage, or may display prompt information used to prompt that the input signal is incorrect, or may directly terminate the communication with the automatic voice service system, the present embodiment is not limited thereto. For example, the detection result of the terminal device shows that '*' is inputted, which is not corresponding to any of the keyboard signals '0', '1', '2', '3', '4', '5', '6' and '7', and then the terminal device may terminate the call.

(3) If the input signal is one of the preset keyboard signals which are prompted to be from the input prompt information of the $i^{th}$ stage, the terminal device performs the step of determining the input prompt information of the $(i+1)^{th}$ stage that is triggered by the input signal according to the service process and the input prompt information of the $i^{th}$ stage, when i<n and the service process includes input prompt information of a $(i+1)^{th}$ stage corresponding to the input prompt information of the $i^{th}$ stage upon triggering of the input signal.

If the detection result of the terminal device shows that the input signal is one of the preset keyboard signals which are prompted to be from the input prompt information of the $i^{th}$ stage, the terminal device may continue performing the third substep, which will not be elaborated herein.

It should be noted that, in step 304, when i<n and the service process includes the input prompt information of the $(i+1)^{th}$ stage corresponding to the input prompt information of the $i^{th}$ stage upon triggering of the input signal, the input prompt information of the $i^{th}$ stage is a second type of prompt information that is prompt information used to prompt the user to input his or her personalized information, the terminal device may also perform the following steps.

(1) The input signal is sent to the automatic voice service system.

As different users may have different personalized information, the terminal device cannot determine whether the input signal from the user is correct according to the obtained service process. Thus, in order to determine the input signal from the user, the terminal device may send the input signal to the automatic voice service system.

For example, after the user has inputted a 6-bit password, the terminal device may send the received input signal corresponding to the password to the automatic voice service system since it can not determine whether the inputted password is correct.

After the automatic voice service system receives the input signal sent by the terminal device, the automatic voice service system may verify the received input signal, and returns voice prompt information after verifying the input signal. For example, after receiving the input signal, the automatic voice service system verifies whether the password from the user is correct according to the input signal and a prestored password for the user. When the determination result shows that the input signal is correct, the automatic voice service system may directly enter into next stage and send back corresponding voice prompt information. Moreover, when the determination result shows that the input signal is incorrect, the automatic voice service system may return prompt information used to prompt that the input signal is incorrect. For example, the returned content is voice prompt information including audible sound 'the password you entered is incorrect, please enter again', which will not be elaborated herein.

(2) The voice prompt information returned by the automatic voice service system is received after the automatic voice service system has verified the input signal.

(3) The voice prompt information is recognized and converted into text prompt information.

After the terminal device receives the voice prompt information returned by the automatic voice service system, the terminal device may start up a voice identification function or application, thereby recognizing the received voice prompt information and converting it into text prompt information.

(4) It is determined what stage the call is at according to the text prompt information, and the input prompt information of the determined stage is used as the input prompt information of the $(i+1)^{th}$ stage.

The terminal device determines what stage of the service process the call is at according to recognized text information, and uses the input prompt information of the determined stage as the input prompt information of the $(i+1)^{th}$ stage.

For example, when the determination result of the automatic voice service system shows that the password from the user is correct and it goes to the voice prompt information of next stage, the terminal device may determine that the call has entered into the $(i+1)^{th}$ stage of the service process according to the text prompt information corresponding to the voice prompt information. If the determination result of the automatic voice service system shows that the password from the user is incorrect and it returns the corresponding prompt information, the terminal device may determine what stage of the service process the call is at according to the text prompt information corresponding to the voice prompt information, and use the input prompt information of the determined stage as the input prompt information of the $(i+1)^{th}$ stage.

After the terminal device determines the input prompt information of the $(i+1)^{th}$ stage, the terminal device may add i by 1, and perform the step of displaying the input prompt information of the $i^{th}$ stage of the service process again. In another word, the terminal device performs the first substep again, but the present embodiment is not limited thereto.

It should be noted that, in certain embodiments, when the automatic voice service system verifies the input signal, the call may need to be switched to another automatic voice service system. For example, the automatic voice service system detects that a bank card number from the user is a card number of a 'VIP' (Very Important Person) card, the automatic voice service system may transfer the call to a VIP automatic voice service system, and return voice prompt information to the user. After receiving the voice prompt information, the terminal device may obtain a service process of the VIP automatic voice service system, and continues to determine input prompt information that needs to be displayed according to the newly obtained service process, but the present embodiment is not limited thereto.

Figure 3D:
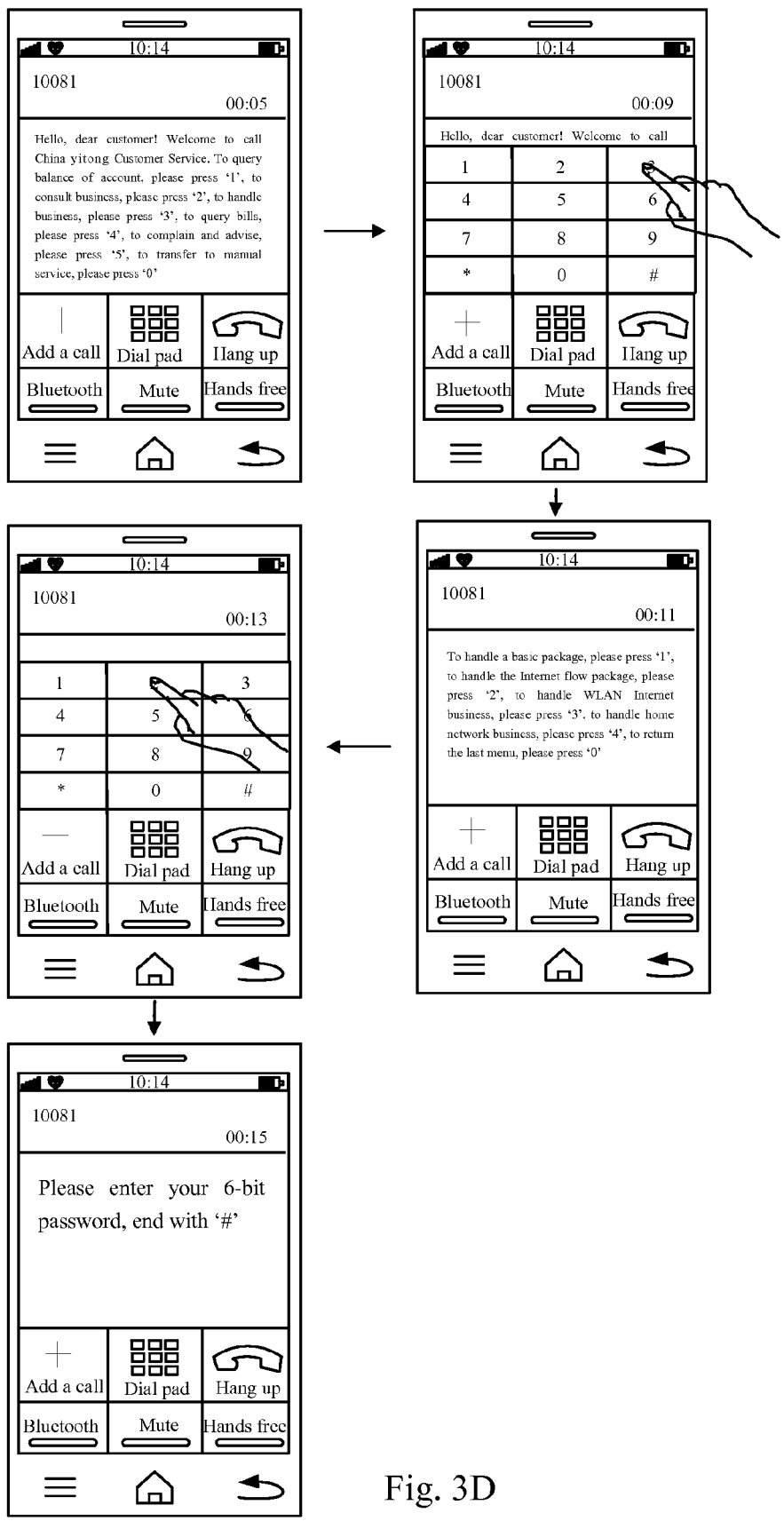
FIG. 3D is still another display schematic diagram illustrating display of input prompt information on a terminal device, according to an exemplary embodiment.

Hereinafter, another embodiment will be elaborated with reference to FIG. 3D. As shown in FIG. 3D, after the terminal device displays input prompt information of the first stage, the input signals '3' to make a request for handling business. Then the terminal device determines input prompt information of the second stage according to a process state machine and the input signal '3', and displays the input prompt information of the second stage. After the user has seen the input prompt information of the second stage displayed on the terminal device, the input signals '2' to make a request for handling the Internet flow package business. Since input prompt information of the third stage corresponding to the input prompt information of the second stage exists upon triggering of the input '2', the terminal device may determine the input prompt information of the third stage upon triggering of input '2' according to the process state machine of '10081', and display the input prompt information of the third stage. After the user has seen the input prompt information displayed on the terminal device, the user may input a 6-bit password of his/her own cell phone account and end with '#'. The terminal device sends a keyboard signal corresponding to the 6-bit password to the automatic voice service system, and receives voice prompt information returned by the automatic voice service system after the automatic voice service system has verified that the password is correct. After the terminal device recognizes the voice prompt information and converts it into text prompt information, the terminal device determines that the call has entered into the fourth stage of the service process, and then the terminal device may display input prompt information of the fourth stage.

It should be noted that service processes of some automatic voice service systems may change over time, or some new voice service systems may occur. Thus, when the server detects these changes, the server may send a service process of a target service number to the terminal device. Correspondingly, the terminal device may perform the following steps.

Firstly, the service process of the target service number sent by the server is received.

The terminal device may receive the service process of the target service number sent by the server.

Secondly, it is detected whether prestored service processes of service numbers of the terminal device include the service process of the target service number.

The terminal device may detect whether prestored service processes of the service numbers have a service process with a service number identical to the received target service number. If the detection result shows that the same number exists, the terminal device may determine that the prestored service processes of the service numbers include the service process of the target service number. Moreover, if the detection result shows that the same number does not exist, the terminal device may determine that the prestored service processes of the service numbers do not have the service process of the target service number.

Thirdly, if the terminal device does not have the service process of the target service number, it may store the received service process of the target service number.

If the detection result shows that the terminal device does not have the service process of the target service number, the terminal device may store the received service process of the target service number.

Fourthly, if the detection result shows that the terminal device has the service process of the target service number, it may use the received service process of the target service number to update the stored service process of the target service number.

If the terminal device has the service process of the target service number, which means that the service process of the target service number may need to be updated, the terminal device may use the received service process of the target service number to update the prestored service process of the target service number to make the terminal device obtain the latest service process. However, the present embodiment is not limited thereto.

In conclusion, in the method for obtaining the voice service provided by the embodiments of the present disclosure, by directly displaying the input prompt information of the service process of an ongoing call on a screen of the terminal device, the user may directly input his or her selections according to the input prompt information displayed on the screen, without waiting for playing the whole voice prompt information. The method avoids the problems in the related art that the user needs to hear the whole voice prompt information to get understanding of what response should be input to proceed with the query, and thus it takes the user too long to wait and shortens a service life of the terminal device's battery. In this way, the user may directly input according to the input prompt information displayed on the screen, and the waiting time of the user can be reduced. Moreover, for the embodiment, with the input prompt information displayed on the terminal device, the input prompt information may be visible to the user and not require the user to hear that, which is convenient for the use of people with relatively weak hearing.

Device embodiments of the present disclosure will be elaborated hereinafter, which may be used to carry out the method embodiments of the present disclosure. For details not disclosed in the device embodiments of the present disclosure, the method embodiments of the present disclosure may be referred to.

FIG. 4 is a schematic diagram illustrating an apparatus for obtaining a voice service, according to an exemplary embodiment. As shown in FIG. 4, the apparatus for obtaining the voice service may be implemented on the terminal device 120 in the implementation environment shown in FIG. 1. The apparatus for obtaining the voice service may include, but be not limited to, a process obtaining module 410, a signal receiving module 420 and a signal sending module 430.

The process obtaining module 410 is configured to obtain information on a service process corresponding to a service number of a call, wherein the information on the service process comprises input prompt information for each stage of the service process, and the input prompt information is used to prompt a user for input.

The signal receiving module 420 is configured to display, after getting through the call, the input prompt information of the service process obtained by the process obtaining module 410, and receive the input signal from the user in response to the input prompt information.

The signal sending module 430 is configured to send the input signal received by the signal receiving module 420 to an automatic voice service system to obtain a service therefrom.

In conclusion, in the apparatus for obtaining the voice service provided by the embodiments of the present disclosure, by directly displaying the input prompt information of the service process of an ongoing call on a screen of the terminal device, the user may directly input his or her selections according to the input prompt information displayed on the screen, without waiting for playing the whole voice prompt information. The method avoids the problems in the related art that the user needs to hear the whole voice prompt information to get understanding of what response should be input to proceed with the query, and thus it takes the user too long to wait and shortens a service life of the terminal device's battery. In this way, the user may directly input according to the input prompt information displayed on the screen, and the waiting time of the user can be reduced. Moreover, for the embodiment, with the input prompt information displayed on the terminal device, the input prompt information may be visible to the user and not require the user to hear that, which is convenient for the use of people with relatively weak hearing.

Figure 5A:
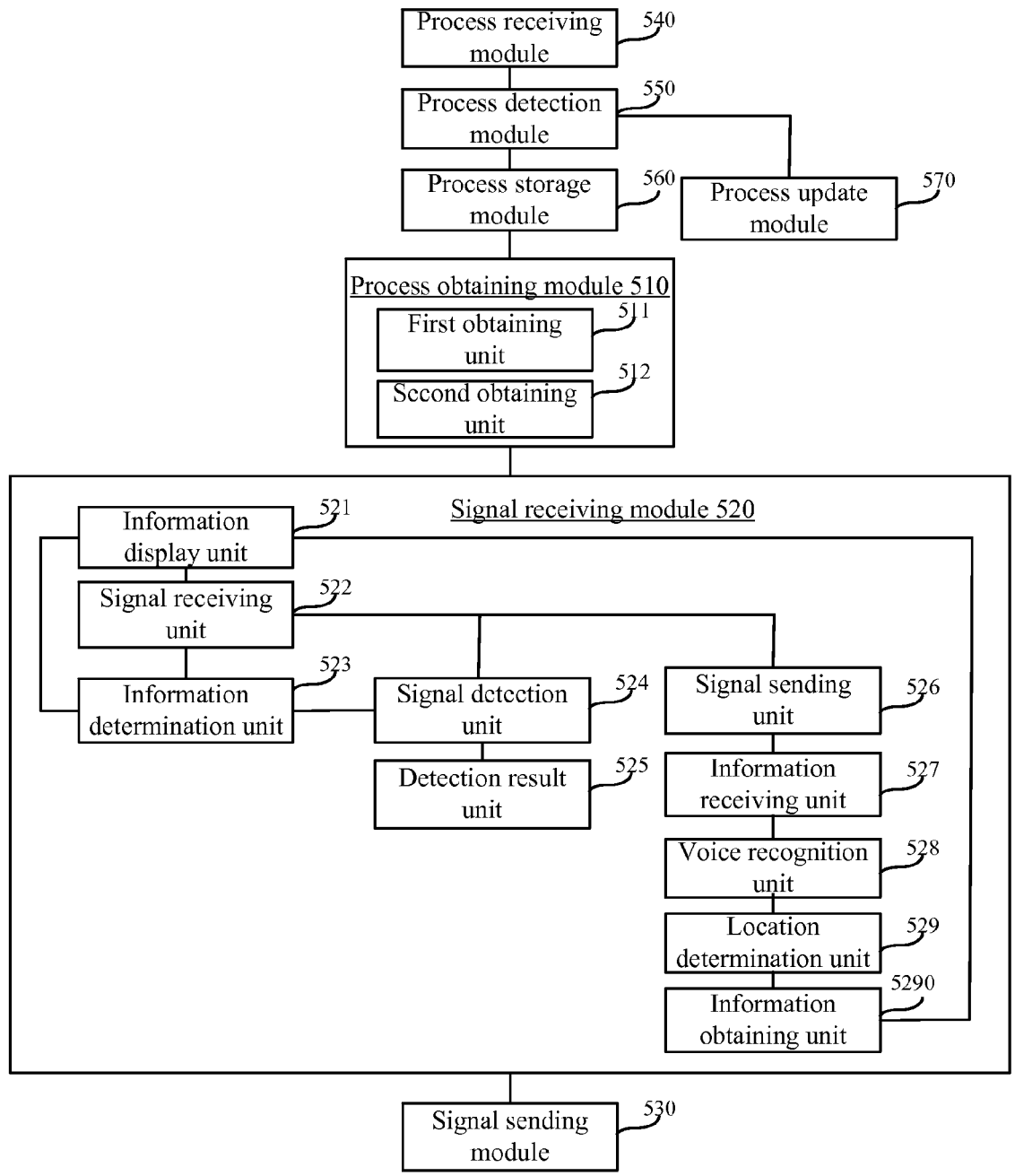
FIG. 5A is a schematic diagram illustrating an apparatus for obtaining a voice service, according to another exemplary embodiment.

FIG. 5 is a schematic diagram illustrating an apparatus for obtaining a voice service, according to another exemplary embodiment. As shown in FIG. 5, the apparatus for obtaining the voice service may be implemented on the terminal device 120 in the implementation environment shown in FIG. 1. The apparatus for obtaining the voice service may include, but be not limited to, a process obtaining module 510, a signal receiving module 520 and a signal sending module 530.

The process obtaining module 510 is configured to obtain information on a service process corresponding to a service number of a call, wherein the information on the service process comprises input prompt information for each stage of the service process, and the input prompt information is used to prompt a user for input.

The signal receiving module 520 is configured to display, after getting through the call, the input prompt information of the service process obtained by the process obtaining module 510, and receive the input signal from the user in response to the input prompt information.

The signal sending module 530 is configure to send the input signal received by the signal receiving module 520 to an automatic voice service system to obtain a service therefrom.

In a first example, the process obtaining module 510 includes a first obtaining unit 511 or a second obtaining unit 512.

The first obtaining unit 511 is configured to select the service process of the service number of the call from pre-stored service processes of a plurality of service numbers.

The second obtaining unit 512 is configured to send the service number to a server configured to select the service process corresponding to the service number of the call from pre-stored service processes of a plurality service numbers, and receive the information on the service process of the service number from the server.

In a second example, the apparatus further includes: a process receiving module 540 configured to receive information on a service process of a target service number from the server; a process detection module 550 configured to detect whether the pre-stored service processes of the plurality of service numbers include the service process of the target service number; a process storage module 560 configured to store the received information on the service process of the target service number if the pre-stored service processes of the plurality of service numbers do not include the service process of the target service number; and a process update module 570 configured to update the pre-stored service process of the target service number with the received information on the service process of the target service number if the pre-stored service processes of the plurality of service numbers include the service process of the target service number.

In a third example, the signal receiving module 520 includes: an information display unit 521 configured to display input prompt information of an $i^{th}$ stage of the service process when the service process comprises n stages, wherein n and i are positive integers and i is of an initial value of 1; a signal receiving unit 522 configured to receive a input signal from the user in response to the input prompt information of the $i^{th}$ stage displayed by the information display unit 521; an information determination unit 523 configured to, when i<n and the service process has input prompt information of an $(i+1)^{th}$ stage corresponding to the input prompt information of the $i^{th}$ stage upon triggering of the input signal, determine input prompt information of the $(i+1)^{th}$ stage triggered by the input signal according to the service process and the input prompt information of the $i^{th}$ stage; wherein the information display unit 521 is further configured to add i by 1, and re-perform the step of displaying the input prompt information of the $i^{th}$ stage of the service process.

Figure 5B:
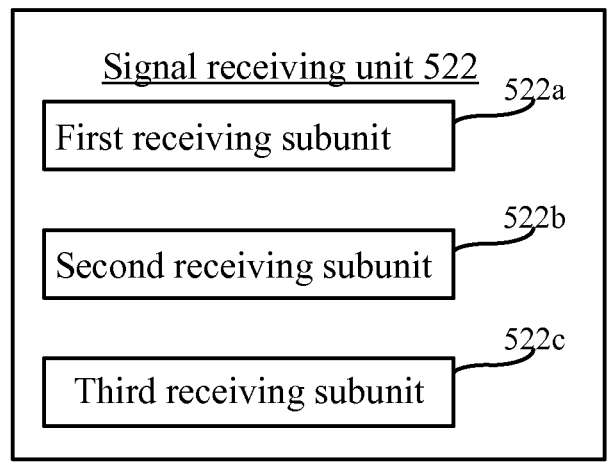
FIG. 5B is a schematic diagram illustrating a signal receiving unit, according to another exemplary embodiment.

Referring to FIG. 5B, in a fourth example, the signal receiving unit 522 includes a first receiving subunit 522a, a second receiving subunit 522b or a third receiving subunit 522c.

The first receiving subunit 522a is configured to receive a single character from the user, and use an input signal corresponding to the single character as the input signal.

The second receiving subunit 522b is configured to successively receive one or more characters from the user until receiving a predetermined character, and use an input signal corresponding to the one or more characters received before the predetermined character as the input signal.

The third receiving subunit 522c is configured to successively receive one or more characters from the user, detect whether a number of the received characters reaches a predetermined number, and use an input signal corresponding to the predetermined number of characters as the input signal if the number of the received characters reaches the predetermined number.

Figure 5C:
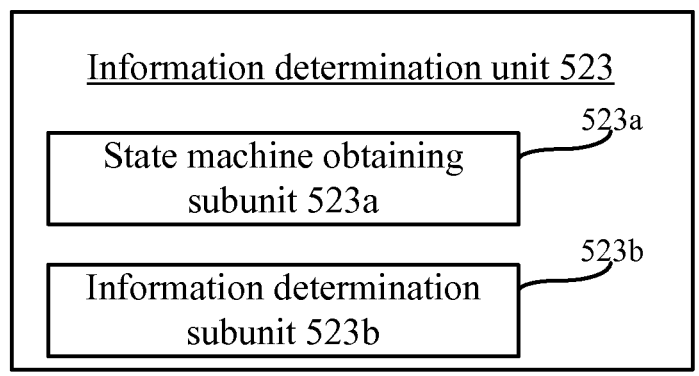
FIG. 5C is a schematic diagram illustrating an information determination unit, according to another exemplary embodiment.

Referring to FIG. 5C, in a fifth possible implementary manner of the present embodiment, the information determination unit 523 includes: a state machine obtaining subunit 523a configured to obtain a process state machine of the service process, wherein each state in the process state machine is represented by input prompt information corresponding to the state; and an information determination subunit 523b configured to determine the input prompt information of the $(i+1)^{th}$ stage triggered by the input signal according to the process state machine obtained by the state machine obtaining subunit 523a and the input prompt information of the $i^{th}$ stage.

In a sixth example, the signal receiving module 520 further includes: a signal detection unit 524 configured to, if the input prompt information of the $i^{th}$ stage is a first type of prompt information, detect whether the input signal is one of preset keyboard signals which are prompted to be input by the input prompt information of the $i^{th}$ stage, wherein the first type of prompt information is prompt information used to prompt the user to input one of the preset keyboard signals; and a detection result unit 525 configured to, if the input signal is not one of the preset keyboard signals which are prompted to be input by the input prompt information of the $i^{th}$ stage, display the input prompt information of the $i^{th}$ stage, display prompt information used to prompt that the input signal is incorrect, or terminate the communication with the automatic voice service system.

In a seventh example, the information determination unit 523 is configured to, if the input signal is one of the preset keyboard signals which are prompted to be input by the input prompt information of the $i^{th}$ stage, perform the step of determining input prompt information of the $(i+1)^{th}$ stage triggered by the input signal according to the service process and the input prompt information of the $i^{th}$ stage, when i<n and the service process has input prompt information of the $(i+1)^{th}$ stage corresponding to the input prompt information of the $i^{th}$ stage upon triggering of the input signal.

In an eighth example, the signal receiving module 520 further includes: a signal sending unit 526 configured to send the input signal to the automatic voice service system if i<n, the service process has the input prompt information of the $(i+1)^{th}$ stage corresponding to the input prompt information of the $i^{th}$ stage upon triggering of the input signal, and the input prompt information of the $i^{th}$ stage is a second type of prompt information, wherein the second type of prompt information is prompt information used to prompt the user to input his or her personalized information; and an information receiving unit 527 configured to receive voice prompt information from the automatic voice service system after the automatic voice service system has verified the input signal.

In a ninth example, the signal receiving module 520 further includes: a voice recognition unit 528 configured to recognize the voice prompt information as text prompt information; a location determination unit 529 configured to determine what stage the call is at in the service process according to the text prompt information; and an information obtaining unit 5290 configured to use input prompt information of the determined stage as the input prompt information of the $(i+1)^{th}$ stage.

The information display unit 521 is configured to add i by 1, and re-perform the step of displaying the input prompt information of the $i^{th}$ stage of the service process again.

In conclusion, in the apparatus for obtaining the voice service provided by the embodiments of the present disclosure, by directly displaying the input prompt information of the service process of an ongoing call on a screen of the terminal device, the user may directly input his or her selections according to the input prompt information displayed on the screen, without waiting for playing the whole voice prompt information. The method avoids the problems in the related art that the user needs to hear the whole voice prompt information to get understanding of what response should be input to proceed with the query, and thus it takes the user too long to wait and shortens a service life of the terminal device's battery. In this way, the user may directly input according to the input prompt information displayed on the screen, and the waiting time of the user can be reduced. Moreover, for the embodiment, with the input prompt information displayed on the terminal device, the input prompt information may be visible to the user and not require the user to hear that, which is convenient for the use of people with relatively weak hearing.

With respect to the devices in the above embodiments, the specific manners for performing operations for individual modules therein have been described in detail in the embodiments regarding the method for sending information in the voice service, which will not be elaborated herein.

Figure 6:
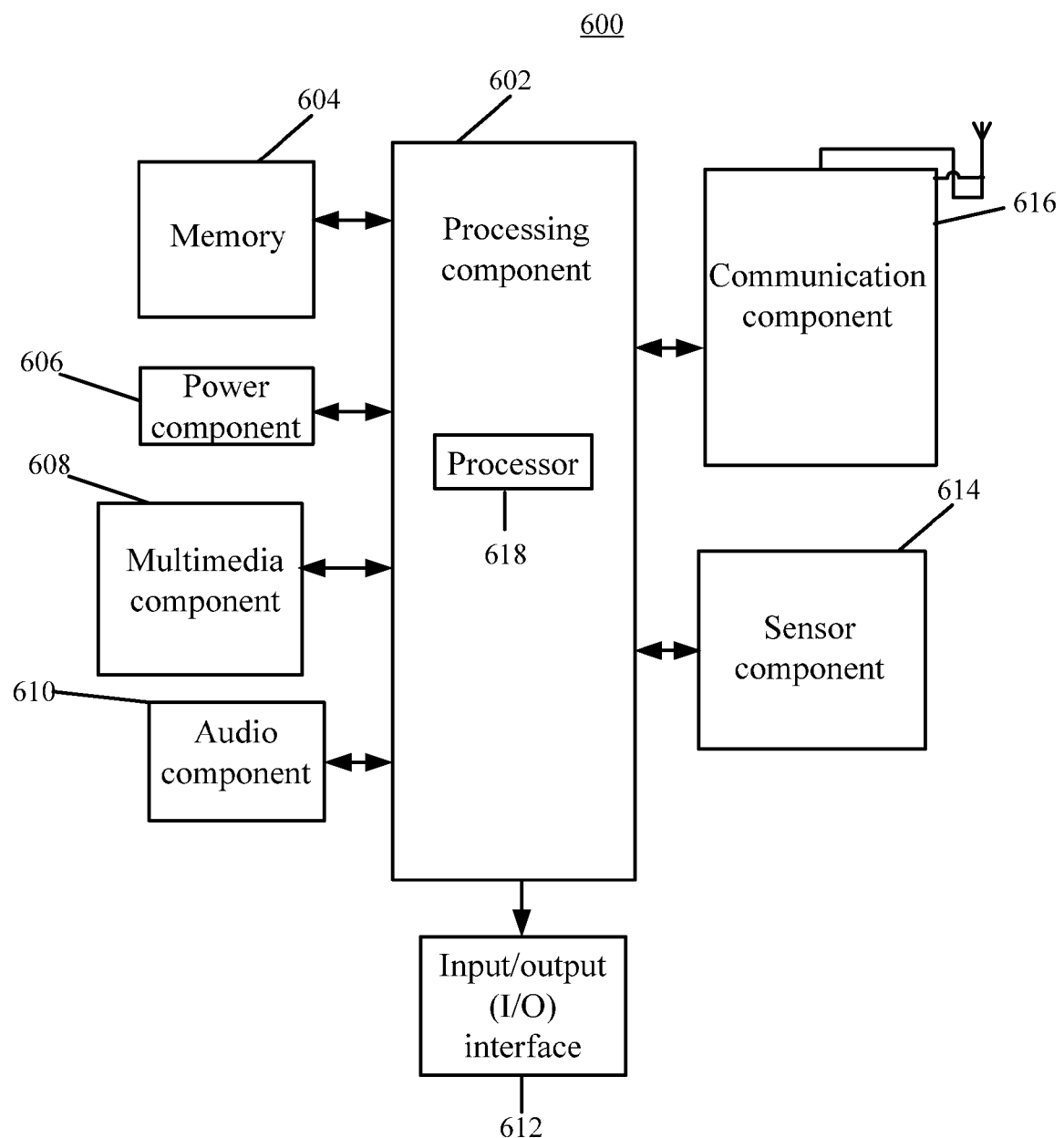
FIG. 6 is a schematic diagram illustrating a device used for obtaining a voice service, according to an exemplary embodiment.

FIG. 6 is a block diagram illustrating a device 600 for obtaining a voice service, according to an exemplary embodiment. For example, the device 600 may be a mobile phone, a computer, a digital broadcast terminal, a messaging device, a gaming console, a tablet, a medical device, exercise equipment, a personal digital assistant and the like.

Referring to FIG. 6, the device 600 may include one or more of the following components: a processing component 602, a memory 604, a power component 606, a multimedia component 608, an audio component 610, an input/output (I/O) interface 612, a sensor component 614, and a communication component 616.

The processing component 602 usually controls overall operations of the device 600, such as operations associated with display, telephone calls, data communications, camera operations and recording operations. The processing component 602 may include one or more processors 618 to execute instructions to perform all or a part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the device 600. Examples of such data include instructions for any application or method operated on the device 600, contact data, phonebook data, messages, pictures, videos, etc. The memory 604 may be implemented by any type of volatile or non-volatile memory device or combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or optical disk.

The power component 606 provides power to various components of the device 600. The power component 606 may include a power management system, one or more power sources, and other components associated with the generation, management, and distribution of power in the device 600.

The multimedia component 608 includes a screen for providing an output interface between the device 600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 608 includes a front camera and/or a rear camera. The front camera and/or the rear camera may receive external multimedia data while the device 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone (MIC) configured to receive an external audio signal when the device 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, a button, and the like. The button may include, but not limited to: a home button, a volume button, a starting button and a locking button.

The sensor component 614 includes one or more sensors to provide status assessments of various aspects of the device 600. For instance, the sensor component 614 may detect an open/closed status of the device 600, relative position of components, e.g., the display and the keyboard, of the device 600, a change in position of the device 600 or a component of the device 600, a presence or absence of an user contact with the device 600, an orientation or an acceleration/deceleration of the device 600, and a change in temperature of the device 600. The sensor component 614 may include a proximity sensor configured to detect the presence of nearby objects without any physical contact. The sensor component 614 may further include a light sensor, such as a CMOS or CCD image sensor, for use in imaging applications. In some embodiments, the sensor component 614 may further include an accelerometer sensor, a gyroscope sensor, a magnetic sensor, a pressure sensor, or a temperature sensor.

The communication component 616 is configured to facilitate communication, in a wire or wireless manner, between the device 600 and other devices. The device 600 can access a wireless network based on a communication standard, such as WiFi, 2G or 3G, or a combination thereof. In one exemplary embodiment, the communication component 616 receives a broadcast signal or broadcast associated information from an external broadcast management system via a broadcast channel. In one exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-bandwidth (UWB) technology, a Bluetooth (BT) technology, and other technologies.

In exemplary embodiments, the device 600 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, for performing the above described methods.

In exemplary embodiments, there is further provided a non-transitory computer readable storage medium including instructions, such as included in the memory 604, executable by the processor 618 in the device 600, for performing the above-described methods. For example, the non-transitory computer-readable storage medium may be a ROM, a random access memory (RAM), a CD-ROM, a magnetic tape, a floppy disc, an optical data storage device and the like.

It should be understood that the present disclosure is not limited to precise structures which are described above and shown in the accompanying drawings, and may be modified and changed without departing from the range of the present disclosure. The scope of the present disclosure is only defined by the appended claims.

What is claimed is:

1. A method for obtaining a voice service, comprising:
   obtaining information on a service process corresponding to a service number of a call, wherein the information on the service process comprises input prompt information for each stage of the service process, and the input prompt information is used to prompt a user for input;
   displaying, after getting through the call, the input prompt information of the service process;
   receiving an input signal from the user in response to the input prompt information; and
   sending the input signal to an automatic voice service system to obtain a service therefrom;
   wherein displaying, after getting through the call, the input prompt information of the service process and receiving the input signal from the user in response to the input prompt information comprises:
   when the service process comprises n stages, displaying input prompt information of an $i^{th}$ stage of the service process, wherein n and i are positive integers and i is of an initial value of 1;
   receiving an input signal from the user in response to the input prompt information of the $i^{th}$ stage;
   when i<n and the service process has input prompt information of an $(i+1)^{th}$ stage corresponding to the input prompt information of the $i^{th}$ stage upon triggering of the input signal, determining input prompt information of the $(i+1)^{th}$ stage triggered by the input signal according to the service process and the input prompt information of the $i^{th}$ stage; and
   adding i by 1, and re-performing the step of displaying the input prompt information of the $i^{th}$ stage of the service process.

2. The method according to claim 1, wherein obtaining information on the service process corresponding to the service number of the call comprises:
   selecting the service process corresponding to the service number of the call from pre-stored service processes of a plurality of service numbers; or
   sending the service number to a server configured to select the service process corresponding to the service number of the call from pre-stored service processes of a plurality service numbers, and receiving the information on the service process corresponding to the service number from the server.

3. The method according to claim 2, wherein the method further comprises:
   receiving information on a service process of a target service number from the server;
   detecting whether the pre-stored service processes of the plurality of service numbers include the service process of the target service number;
   if the pre-stored service processes of the plurality of service numbers do not include the service process of the target service number, storing the received information on the service process of the target service number; and
   if the pre-stored service processes of the plurality of service numbers include the service process of the target service number, updating the pre-stored service process of the target service number with the received information on service process of the target service number.

4. The method according to claim 1, wherein receiving the input signal from the user in response to the input prompt information of the $i^{th}$ stage comprises:
   receiving a single character inputted by the user, and using an input signal corresponding to the single character as the input signal;
   successively receiving one or more characters inputted by the user until receiving a predetermined character, and using an input signal corresponding to the one or more characters received before the predetermined character as the input signal; or
   successively receiving one or more characters inputted by the user, detecting whether a number of the received characters reaches a predetermined number, and using an input signal corresponding to the predetermined number of characters as the input signal if the number of the received characters reaches the predetermined number.

5. The method according to claim 1, wherein determining the input prompt information of the $(i+1)^{th}$ stage triggered by the input signal according to the service process and the input prompt information of the $i^{th}$ stage comprises:
   obtaining a process state machine of the service process, wherein each state in the process state machine is represented by input prompt information corresponding to the state; and
   determining the input prompt information of the $(i+1)^{th}$ stage triggered by the input signal according to the process state machine and the input prompt information of the $i^{th}$ stage.

6. The method according to claim 1, wherein the method further comprises:
   if the input prompt information of the $i^{th}$ stage is a first type of prompt information, detecting whether the input signal is one of preset keyboard signals which are prompted to be input by the input prompt information of the $i^{th}$ stage, wherein the first type of prompt information is prompt information used to prompt the user to input one of the preset keyboard signals; and if the input signal is not one of the preset keyboard signals which are prompted to be input by the input prompt information of the $i^{th}$ stage, displaying the input prompt information of the $i^{th}$ stage, displaying prompt information used to prompt that the input signal is incorrect, or terminating the communication with the automatic voice service system.

7. The method according to claim 6, wherein the method further comprises:

if the input signal is one of the preset keyboard signals which are prompted to be input by the input prompt information of the $i^{th}$ stage, performing the step of determining input prompt information of the $(i+1)^{th}$ stage triggered by the input signal according to the service process and the input prompt information of the $i^{th}$ stage, when i<n and the service process has input prompt information of the $(i+1)^{th}$ stage corresponding to the input prompt information of the $i^{th}$ stage upon triggering of the input signal.

8. The method according to claim 1, wherein the method further comprises:

if i<n, the service process has the input prompt information of the $(i+1)^{th}$ stage corresponding to the input prompt information of the $i^{th}$ stage upon triggering of the input signal, and the input prompt information of the $i^{th}$ stage is a second type of prompt information, sending the input signal to the automatic voice service system, wherein the second type of prompt information is prompt information used to prompt the user to input his or her personalized information; and receiving voice prompt information from the automatic voice service system after the automatic voice service system has verified the input signal.

9. The method according to claim 8, wherein the method further comprises:

recognizing the voice prompt information as text prompt information;

determining what stage the call is at in the service process according to the text prompt information, and using input prompt information of the determined stage as the input prompt information of the $(i+1)^{th}$ stage; and adding i by 1, and re-performing the step of displaying the input prompt information of the $i^{th}$ stage of the service process.

10. A device for obtaining a voice service, comprising:
a processor; and
a memory for storing instructions executed by the process;
wherein the processor is configured to:
obtain information on a service process corresponding to a service number of a call, wherein the information on the service process comprises input prompt information for each stage of the service process, and the input prompt information is used to prompt a user for input;
display, after getting through the call, the input prompt information of the service process;
receive an input signal from the user in response to the input prompt information; and
send the input signal to an automatic voice service system to obtain a service therefrom;
wherein display, after getting through the call, the input prompt information of the service process and receive an input signal from the user in response to the input prompt information comprises:

when the service process comprises n stages, display input prompt information of an $i^{th}$ stage of the service process, wherein n and i are positive integers and i is of an initial value of 1;

receive a input signal from the user in response to the input prompt information of the $i^{th}$ stage;

when i<n and the service process has input prompt information of an $(i+1)^{th}$ stage corresponding to the input prompt information of the $i^{th}$ stage upon triggering of the input signal, determine input prompt information of the $(i+1)^{th}$ stage triggered by the input signal according to the service process and the input prompt information of the $i^{th}$ stage; and add i by 1, and re-perform the step of displaying the input prompt information of the $i^{th}$ stage of the service process.

11. The device according to claim 10, wherein the processor is further configured to:

select the service process of the service number of the call from pre-stored service processes of a plurality of service numbers; or send the service number to a server configured to select the service process corresponding to the service number of the call from pre-stored service processes of a plurality service numbers, and receiving the information on service process of the service number from the server.

12. The device according to claim 11, wherein the processor is further configured to:

receive information on a service process of a target service number from the server;

detect whether the pre-stored service processes of the plurality of service numbers include the service process of the target service number;

if the pre-stored service processes of the plurality of service numbers do not include the service process of the target service number, store the received information on the service process of the target service number; and if the pre-stored service processes of the plurality of service numbers include the service process of the target service number, update the pre-stored service process of the target service number with the received information on the service process of the target service number.

13. The device according to claim 10, wherein the processor is further configured to:

receive a single character inputted by the user, and using an input signal corresponding to the single character as the input signal;

successively receive one or more characters inputted by the user until receiving a predetermined character, and using an input signal corresponding to the one or more characters received before the predetermined character as the input signal; or successively receive one or more characters inputted by the user, detecting whether a number of the received characters reaches a predetermined number, and using an input signal corresponding to the predetermined number of characters as the input signal if the number of the received characters reaches the predetermined number.

14. The device according to claim 10, wherein the processor is further configured to:

obtain a process state machine of the service process, wherein each state in the process state machine is represented by input prompt information corresponding to the state; and determine the input prompt information of the $(i+1)^{th}$ stage triggered by the input signal according to the process state machine and the input prompt information of the $i^{th}$ stage.

15. The device according to claim 10, wherein the processor is further configured to:

if the input prompt information of the $i^{th}$ stage is a first type of prompt information, detect whether the input signal is one of preset keyboard signals which are prompted to be input by the input prompt information of the $i^{th}$ stage, wherein the first type of prompt information is prompt information used to prompt the user to input one of the preset keyboard signals;

if the input signal is not one of the preset keyboard signals which are prompted to be input by the input prompt information of the $i^{th}$ stage, display the input prompt information of the $i^{th}$ stage, display prompt information used to prompt that the input signal is incorrect, or terminate the communication with the automatic voice service system.

16. The device according to claim 15, wherein the processor is further configured to:

if the input signal is one of the preset keyboard signals which are prompted to be input by the input prompt information of the $i^{th}$ stage, perform the step of determining input prompt information of the $(i+1)^{th}$ stage triggered by the input signal according to the service process and the input prompt information of the $i^{th}$ stage, when i<n and the service process has input prompt information of the $(i+1)^{th}$ stage corresponding to the input prompt information of the $i^{th}$ stage upon triggering of the input signal.

17. The device according to claim 10, wherein the processor is further configured to:

if i<n, the service process has the input prompt information of the $(i+1)^{th}$ stage corresponding to the input prompt information of the $i^{th}$ stage upon triggering of the input signal, and the input prompt information of the $i^{th}$ stage is a second type of prompt information, send the input signal to the automatic voice service system, wherein the second type of prompt information is prompt information used to prompt the user to input personalized information thereof; and receive voice prompt information from the automatic voice service system after the automatic voice service system has verified the input signal.

18. The device according to claim 17, wherein the processor is further configured to:

recognize the voice prompt information as text prompt information;

determine what stage the call is at in the service process according to the text prompt information, and use input prompt information of the determined stage as the input prompt information of the $(i+1)^{th}$ stage; and add i by 1, and re-perform the step of displaying the input prompt information of the $i^{th}$ stage of the service process.

19. A non-transitory storage medium having stored therein instructions that, when executed by one or more processors of a device for obtaining a voice service, causes the device to perform:

obtaining information on a service process corresponding to a service number of a call, wherein the information on the service process comprises input prompt information for each stage of the service process, and the input prompt information is used to prompt a user for input;

displaying, after getting through the call, the input prompt information of the service process;

receiving an input signal from the user in response to the input prompt information; and sending the input signal to an automatic voice service system to obtain a service therefrom;

wherein displaying, after getting through the call, the input prompt information of the service process and receiving the input signal from the user in response to the input prompt information comprises:

when the service process comprises n stages, displaying input prompt information of an $i^{th}$ stage of the service process, wherein n and i are positive integers and i is of an initial value of 1;

receiving an input signal from the user in response to the input prompt information of the $i^{th}$ stage;

when i<n and the service process has input prompt information of an $(i+1)^{th}$ stage corresponding to the input prompt information of the $i^{th}$ stage upon triggering of the input signal, determining input prompt information of the $(i+1)^{th}$ stage triggered by the input signal according to the service process and the input prompt information of the $i^{th}$ stage; and adding i by 1, and re-performing the step of displaying the input prompt information of the $i^{th}$ stage of the service process.

* * * * *